UNITED STATES PATENT OFFICE.

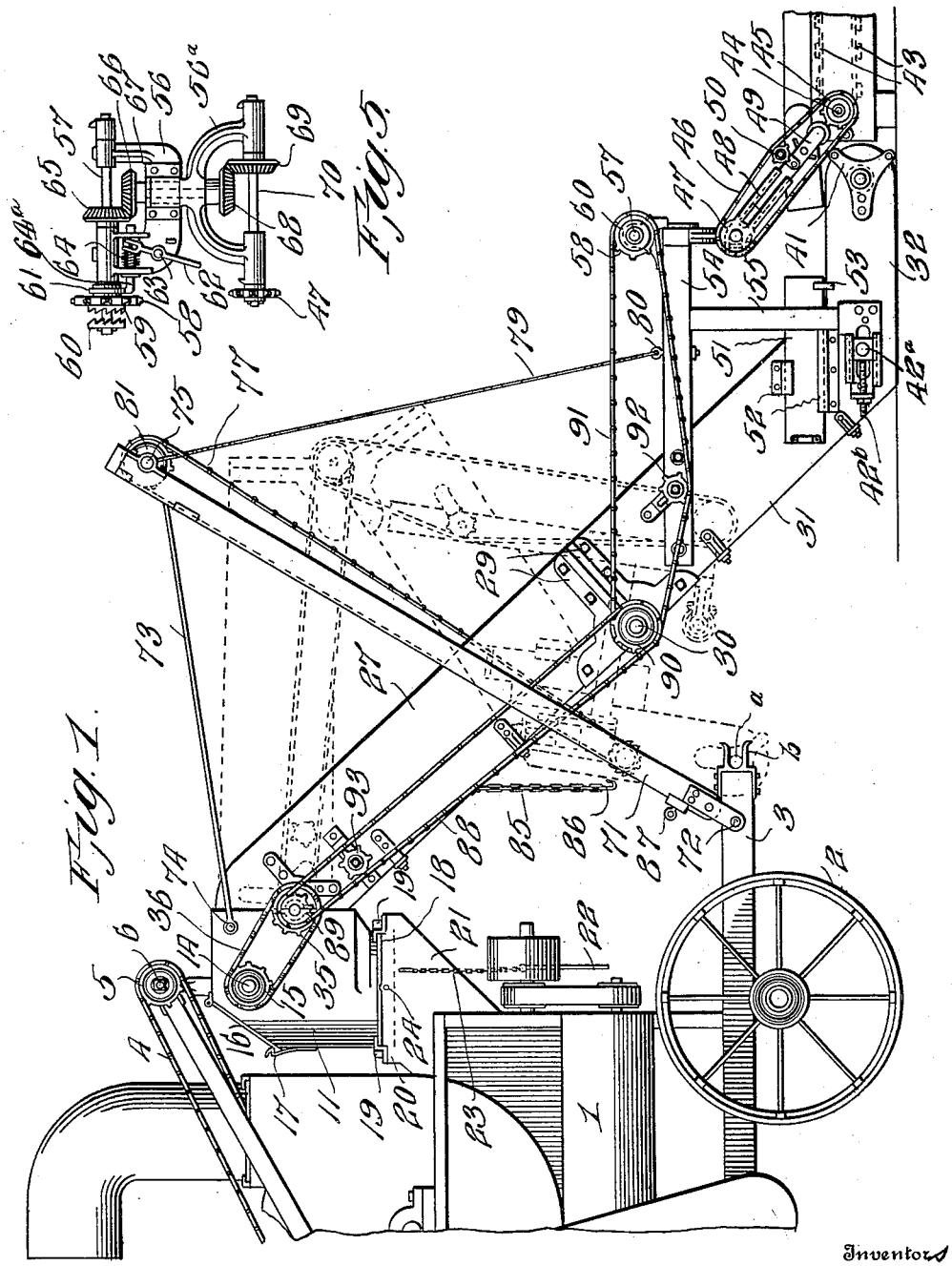

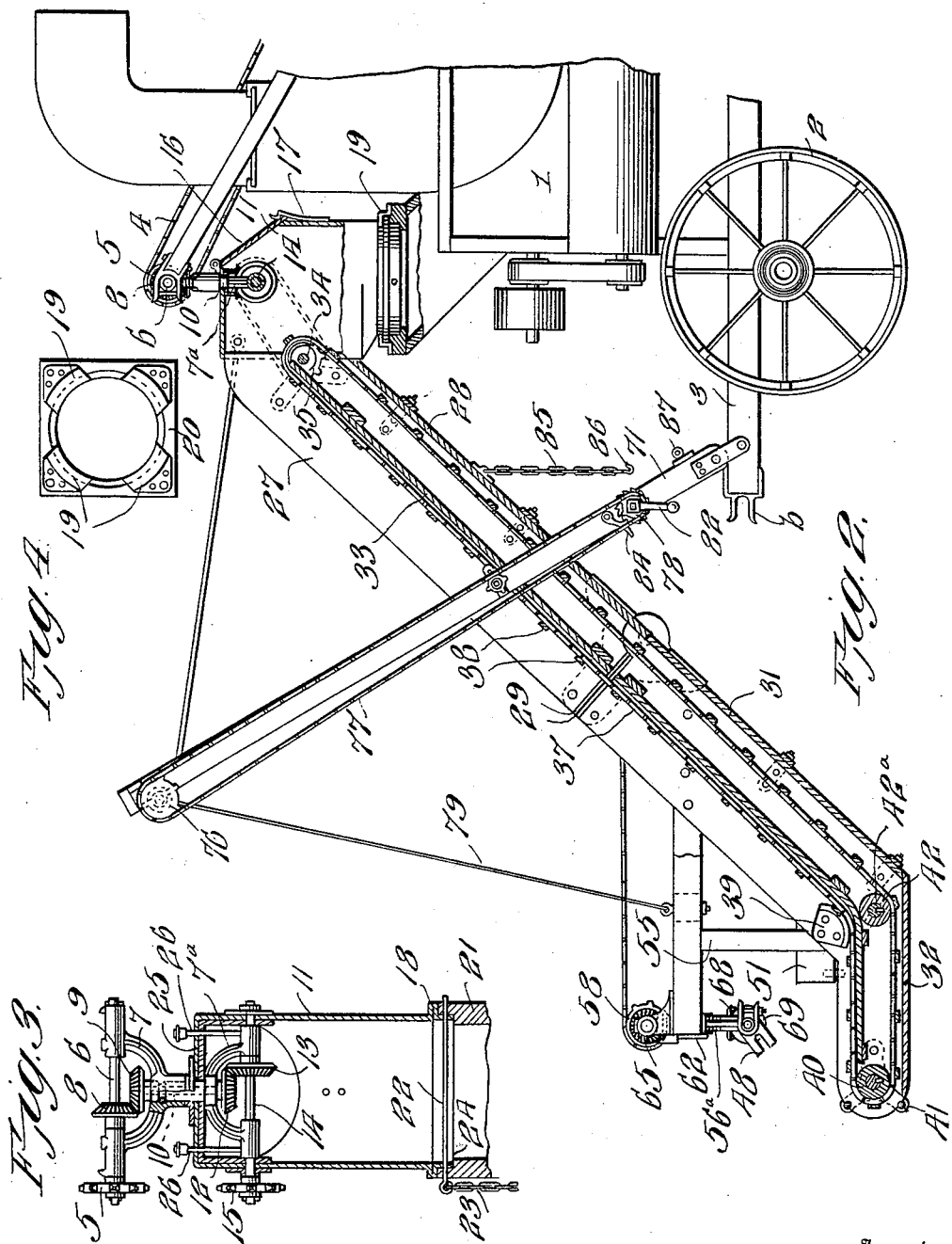

JOSEPH LEGRIS AND EDGAR S. LEGRIS, OF BOURBONNAIS, ILLINOIS.

FEEDER FOR CORN-SHELLERS.

1,008,278.  Specification of Letters Patent.  Patented Nov. 7, 1911.

Application filed April 24, 1909. Serial No. 491,971.

*To all whom it may concern:*

Be it known that we, JOSEPH LEGRIS and EDGAR S. LEGRIS, citizens of the United States of America, residing at Bourbonnais, in the county of Kankakee and State of Illinois, have invented new and useful Improvements in Feeders for Corn-Shellers, of which the following is a specification.

Our invention relates to certain new and useful improvements in feeders for corn shellers, and it consists in the novel combination and arrangement of parts as will be hereinafter more particularly described and pointed out in the claim.

Figure 1 is a side elevation of a feeder made in accordance with this invention and shown connected to a corn sheller of ordinary construction. Fig. 2 is a vertical sectional view of the same. Fig. 3 is a vertical sectional view of the dome head and the parts supported thereby. Fig. 4 is a top plan view of the base upon which the dome head turns. Fig. 5 is a side elevation of the gearing for operating the feeder extension.

Referring to the drawings, the numeral 1 designates a corn sheller which may be of any suitable form or construction, said corn sheller being mounted on wheels 2 and provided with an extended reach 3. A drive chain 4 extends from the motive power of the sheller around a sprocket wheel 5 on a shaft 6 journaled in a yoke 7. The shaft 6 is provided with a beveled gear 8 which meshes with a similar gear 9 mounted on a vertical shaft 10 extending through the yoke 7 and through a similar yoke 7$^a$ within the dome head 11. On the opposite end of the vertical shaft 10 a bevel gear wheel 12 is secured, said bevel gear meshing with a similar gear 13 on a shaft 14 journaled in the yoke 7$^a$, and the ends of said shaft passing through the dome head 11. On the end of the shaft 14 is a sprocket wheel 15. The dome head 11 is provided with a hinged door 16 having a latch 17 for holding said door closed. The lower end of the dome head 11 is practically round and is provided with an outwardly projecting annular flange 18 which is mounted under a series of guide plates 19 secured to a base 20, said base being supported upon the inlet member 21 of the corn sheller. Thus the dome head 11 is permitted to swing from side to side, moving in the guide plates 19. For holding the dome head against turning in the guide plates 19 a pin 22 is provided, said pin being connected by means of a chain 23 to the side of the inlet member 21, and said pin being adapted to be inserted in a perforation 24 extending through the base portion of the dome and through the upper portion of the inlet member 21, as shown more clearly in Fig. 3.

On the inside of the dome head 11 is a cap lining member 25, and the shaft 10 extends through the top of the dome and through said lining cap, and a pair of lubricating tubes 26 extend down through the top and cap and communicate with the bearings of the shaft 14. Thus, it will be seen that the dome head may revolve upon the shaft 10 without interfering with the position of the shaft 6.

Connected pivotally to the open front side of the dome head 11 are the side members 27 of the elevator frame. The bottom 28 of said frame is also pivoted to the dome head at its upper end. The elevator frame consists of an upper member and a lower member connected together by a hinge joint comprising the plates 29 forming bearings for a shaft 30, the lower member 31 of the conveyer frame being hinged upon said shaft so as to permit the frame to assume the raised or dotted line position shown in Fig. 1, whenever it is desired to convey the feeder with the sheller from place to place. The lower end of the conveyer frame is provided with a horizontal bottom extension 32 which is normally disposed upon or immediately above the ground. A platform or board 33 is supported in the conveyer frame immediately under the upper stretch of the apron or endless conveyer. Mounted in the upper end of the conveyer frame is a shaft 34 carrying a roller and at one end having a sprocket wheel 35 which is connected by means of a belt 36 to the sprocket wheel 15 on the shaft 14.

The conveyer belt 37 may comprise the oppositely disposed drive chains provided with slats 38 secured thereto for carrying the corn from the cribs to the sheller. The chains each pass around a guide keeper 39 secured to the lower part of the frame upon opposite sides, the belt passing under the guides 39 and around the roller 40 journaled in plates 41 secured to the sides of the extension 32. A roller 42 is journaled in the extension 32 for guiding the lower stretch of the conveyer belt. The roller 42 is mounted upon a shaft 42$^a$ provided with sliding bearings, said bearings being adjustable by means of the follower screws 42$^b$ which are seated against the bearings for the shaft 42$^a$. As shown in Fig. 1, the drag belt 43 is provided with a shaft 44, and a sprocket wheel 45 on said shaft carries a chain 46 which extends around a sprocket 47 carried by an adjustable bearing 48, one member 49 of which is connected to the drag belt frame. A belt tightener 50 is mounted upon the member 49, as shown more particularly in Fig. 1. Adjustable sliding boards 51 are connected at the sides of the extension 32 and are provided with guide members 52 and a stop 53 which permits the boards 51 to slide up to the drag belt frame to prevent the overflow of corn. Secured to one side of the conveyer frame is an arm 54, said arm being braced by an upright bar 55. Connected to the front end of the arm 54 is a yoke 56 in which is journaled a shaft 57 carrying a sprocket wheel 58 mounted to slide upon the shaft 57 and provided with a clutch member 59 which may be moved into connection with a clutch member 60 carried by the shaft 57. A clutch-operating member 61 is connected to the hub of the sprocket wheel 58, and a forked lever 62 pivoted at 63 on the yoke 56 is adapted to move the clutch members 59 and 60 into operative connection. A spring 64 surrounds a bar 64$^a$ extending from the clutch operating member 61 and moves said member 61 in one direction. On the shaft 57 is a beveled gear 65 which meshes with a similar gear 66 on a shaft 67 mounted in the yoke 56, and extending through said yoke and through a similar yoke 56$^a$. This shaft 67 is provided with a beveled gear 68 which meshes with a similar gear 69 on a shaft 70 journaled in the yoke 56$^a$.

A derrick 71 is pivotally mounted at 72 upon the reach 3 of the sheller and at the upper end said derrick is provided with a brace 73 extending therefrom to the side of the dome head 11, said brace being connected thereto, as at 74. In the derrick is journaled a shaft 75 on which is secured a sprocket wheel 76 around which a chain 77 passes, said chain passing also around a sprocket wheel 78 carried by a shaft journaled near the bottom of the derrick 71. A rope or cable 79 is connected to an eye 80 on the arm 54, the upper end of said rope or cable passing around a drum 81 on the shaft 75. For operating the drum 81 a hand crank 82 is provided, and on the shaft of the sprocket wheel 78 is a ratchet wheel 83, and a pawl 84 is adapted to engage the ratchet wheel 83 and hold the chain 77 against reverse movement. The derrick 71 may be disengaged from the reach 3 and can be supported by means of a chain 85 connected to the conveyer frame 28 and provided with a hook 86 adapted to engage an eye 87 on the derrick. When in this position the conveyer frame may be swung from side to side after the pin 22 has been removed from the perforation 24. At one side of the conveyer frame a drive chain 88 passes around a sprocket wheel 89 on the shaft 34, said chain also passing around a sprocket wheel 90 on the shaft 30. A sprocket chain 91 is operated by a sprocket wheel in the shaft 30, said chain extending around the sprocket wheel 58 on the shaft 57. Suitable chain tighteners 92 and 93 are used for tightening the chains 88 and 91.

When it is desired to fold the conveyer frame to the raised or dotted line position shown in Fig. 1, the drag belt 43 is disconnected and the derrick 71 is operated until the trunnions $a$ at the side of the extension 32 are brought into position to be supported within the yoke $b$ at the outer end of the reach 3. In this position the entire feeder may be carried from place to place with the sheller. When it is desired to adjust the feeder in position for use, the cable 79 is paid out by means of the crank 82 until the parts are in the position shown in full lines in Fig. 1. The feeder may then be swung from side to side into either one of two cribs, as will be understood.

A feeder made in accordance with this invention may be connected to any ordinary power corn sheller and will serve to feed the corn to the sheller as fast as the machine can dispose of the corn. The intake end of the feeder can be quickly adjusted without interfering with the position of the sheller.

Various changes in details of construction may be made without departing from the spirit and scope of the invention as included in the claim.

Having thus described the invention, what is claimed as new, is:—

In a feeder of the character described, a support, a conveyer horizontally and vertically adjustable on the support, a dome-head at one end of the conveyer, means for adjusting the conveyer vertically, the said means being detachably mounted on the support, and means on the conveyer for carrying the adjusting means thereon when detached from said support and on the horizontal adjustment of the conveyer.

In testimony whereof we affix our signatures in presence of two witnesses.

JOSEPH LEGRIS.
EDGAR S. LEGRIS.

Witnesses:
 F. E. LEGRIS,
 GEO. E. LUEHRS.